(12) United States Patent
Lai et al.

(10) Patent No.: US 11,262,865 B2
(45) Date of Patent: *Mar. 1, 2022

(54) SENSOR DEVICE AND SYSTEM AND RELATED CONTROLLER, MULTIPLEXER AND PANEL APPARATUS

(71) Applicant: NOVATEK Microelectronics Corp., Hsin-Chu (TW)

(72) Inventors: Chih-Chang Lai, Taichung (TW); Chih-Yuan Chang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 67 days.

This patent is subject to a terminal disclaimer.

(21) Appl. No.: 16/858,765

(22) Filed: Apr. 27, 2020

(65) Prior Publication Data

US 2020/0257427 A1 Aug. 13, 2020

Related U.S. Application Data

(63) Continuation-in-part of application No. 16/049,823, filed on Jul. 31, 2018, now Pat. No. 10,678,369, which is a continuation-in-part of application No. 14/963,257, filed on Dec. 9, 2015, now Pat. No. 10,055,049.

(51) Int. Cl.
*G06F 3/041* (2006.01)
*G06K 9/00* (2006.01)
*G09G 5/00* (2006.01)

(52) U.S. Cl.
CPC ..... *G06F 3/04164* (2019.05); *G06K 9/00006* (2013.01); *G09G 5/006* (2013.01); *G09G 2310/0297* (2013.01); *G09G 2354/00* (2013.01)

(58) Field of Classification Search
CPC .......... G06F 3/04164; G06F 3/04166; G06K 9/00006; G09G 5/006; G09G 2354/00; G09G 2310/0257
See application file for complete search history.

(56) References Cited

U.S. PATENT DOCUMENTS

| | | | | |
|---|---|---|---|---|
| 8,446,355 B2* | 5/2013 | Uehara | ................ | H04N 13/315 345/100 |
| 9,478,162 B2 | 10/2016 | Lee | | |
| 10,055,049 B2* | 8/2018 | Lai | ...................... | G06F 3/04166 |
| 10,678,369 B2* | 6/2020 | Lai | ........................ | G06F 3/0443 |
| 2005/0088386 A1 | 4/2005 | Kao | | |

(Continued)

*Primary Examiner* — Ricardo Osorio
(74) *Attorney, Agent, or Firm* — Winston Hsu

(57) ABSTRACT

A sensor system includes a sensing panel, at least one multiplexer and a controller. The sensing panel includes one or more sensing areas. The multiplexer is coupled to the one or more sensing areas through one or more connecting wire groups on the sensing panel, wherein each of the connecting wire groups includes one or more connecting wires. The controller is coupled to the at least one multiplexer via one or more control wires and one or more sensing wires. Each of the at least one multiplexer includes one or more switch groups each coupled between one of the one or more sensing wires and one of the connecting wire groups, and each of the switch groups includes one or more switches respectively controlled by one or more control signals transmitted through the one or more control wires.

47 Claims, 13 Drawing Sheets

(56) References Cited

U.S. PATENT DOCUMENTS

| | | |
|---|---|---|
| 2007/0097018 A1 | 5/2007 | Yamamoto |
| 2007/0176184 A1 | 8/2007 | Lee |
| 2009/0273573 A1 | 11/2009 | Hotelling |
| 2012/0105355 A1 | 5/2012 | Souchkov |
| 2012/0154327 A1 | 6/2012 | Liu |
| 2013/0127697 A1* | 5/2013 | Lin ................. G09G 3/3611 345/90 |
| 2013/0176318 A1 | 7/2013 | Dunn |
| 2014/0022185 A1 | 1/2014 | Ribeiro |
| 2014/0152930 A1 | 6/2014 | Lin |
| 2014/0184313 A1 | 7/2014 | Chuang |
| 2014/0292704 A1 | 10/2014 | Cleary |
| 2014/0306925 A1 | 10/2014 | Yeh |
| 2015/0030217 A1 | 1/2015 | Wickboldt |
| 2015/0035797 A1 | 2/2015 | Shahparnia |
| 2015/0109357 A1 | 4/2015 | Nakai |
| 2016/0049129 A1* | 2/2016 | Hekstra ............ G06F 3/04164 345/174 |
| 2016/0240117 A1 | 8/2016 | Xu |
| 2016/0349881 A1* | 12/2016 | Fukushima ......... G06F 3/0412 |
| 2017/0098421 A1 | 4/2017 | Son |
| 2017/0123568 A1 | 5/2017 | Takeda |
| 2020/0211486 A1* | 7/2020 | Wang ................ G09G 3/3614 |

\* cited by examiner

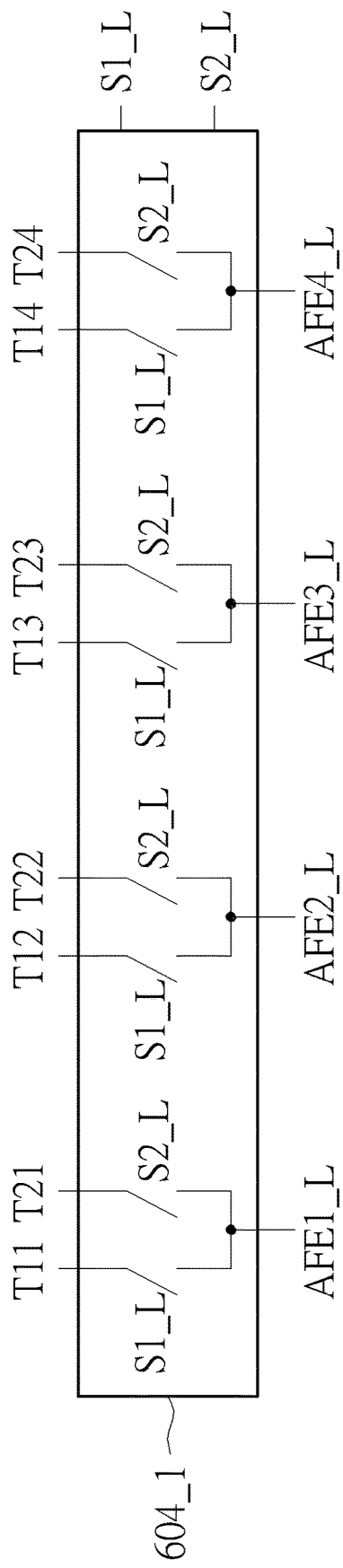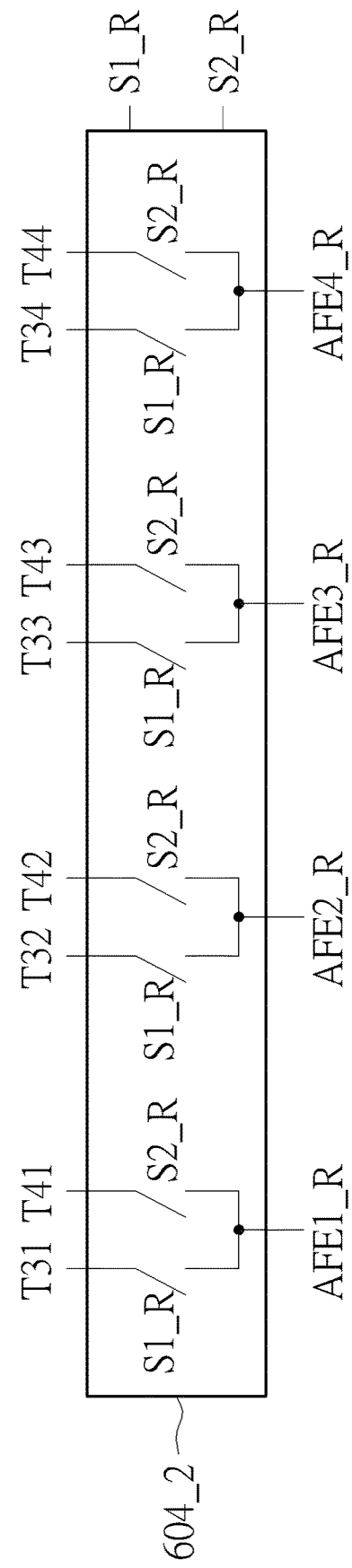
FIG. 7A
FIG. 7B

SENSOR DEVICE AND SYSTEM AND RELATED CONTROLLER, MULTIPLEXER AND PANEL APPARATUS

CROSS REFERENCE TO RELATED APPLICATIONS

This application is a continuation-in-part application of U.S. application Ser. No. 16/049,823, filed on Jul. 31, 2018, which is further a continuation-in-part application of U.S. application Ser. No. 14/963,257, filed on Dec. 9, 2015, now U.S. Pat. No. 10,055,049 B2. The contents of these applications are incorporated herein by reference.

BACKGROUND OF THE INVENTION

1. Field of the Invention

The present invention relates to a sensor device and system and a related controller, multiplexer and panel apparatus, and more particularly, to a multiplexer capable of reducing a pin number of a controller in the sensor system.

2. Description of the Prior Art

In recent years, the sensing technology advances rapidly, and many consumer electronic products such as mobile phones, GPS navigator systems, tablets, personal digital assistants (PDA) and laptops are equipped with sensing functions. A conventional sensor system is composed of a sensing panel and a sensing integrated circuit (IC). The sensing IC is capable of transmitting control signals to the sensing panel and correspondingly receiving sensing signals from sensing areas on the sensing panel.

Please refer to FIG. 1, which is a schematic diagram of a general sensor system 10. As shown in FIG. 1, the sensor system 10 includes a sensing panel 100 and a sensing IC 102. The sensing panel 100 includes 9 sensing areas arranged in a 3×3 array. Each sensing area is connected to the sensing IC 102 via a connecting wire and a contact. In such a situation, the sensing IC 102 should include at least 9 I/O pins for connecting with the sensing areas.

However, as the commercial requirements of larger sensing panels increase, the number of sensing areas on a sensing panel increases with the size of the sensing panel. To date, there may be hundreds or thousands of sensing areas on a sensing panel. For example, in a sensing panel having sensing areas arranged in a 32×18 array, there are 576 sensing areas on the sensing panel. In such a situation, the sensing IC should include at least 576 I/O pins for connecting with the sensing areas. The large number of I/O pins significantly increases the die size of the sensing IC, and thus increases the cost. The wire bonding quality is also reduced since the bonding pitch is limited. Thus, there is a need for improvement over the prior art.

SUMMARY OF THE INVENTION

It is therefore an objective of the present invention to provide a multiplexer disposed between the controller and the sensing panel, to reduce the pin number of the controller.

An embodiment of the present invention discloses a sensor system, which comprises a sensing panel, at least one multiplexer and a controller. The sensing panel comprises one or more sensing areas. The at least one multiplexer is coupled to the one or more sensing areas through one or more connecting wire groups on the sensing panel, wherein each of the one or more connecting wire groups comprises one or more connecting wires. The controller is coupled to the at least one multiplexer via one or more control wires and one or more sensing wires. Each of the at least one multiplexer comprises one or more switch groups each coupled between one of the one or more sensing wires and one of the one or more connecting wire groups, and each of the switch groups comprises one or more switches respectively controlled by one or more control signals transmitted through the one or more control wires.

Another embodiment of the present invention discloses a multiplexer used in a sensor system, wherein the multiplexer is coupleable to a controller via one or more control wires and one or more sensing wires, and the multiplexer is coupleable to a sensing panel through one or more connecting wire groups. Each of the one or more connecting wire groups comprises one or more connecting wires, and the multiplexer comprises one or more switch groups each coupled between one of the sensing wires and one of the one or more connecting wire groups. Each of the switch groups comprises one or more switches, each of which comprises a first connection terminal, a second connection terminal and a control terminal. The first connection terminal is coupled to the controller via one of the one or more sensing wires. The second connection terminal is coupled to the sensing panel, and the sensing panel comprises one or more sensing areas. The control terminal is coupled to one of the one or more control wires, for receiving one of one or more control signals from the controller. The one or more switches in each of the switch groups are respectively controlled by one or more control signals transmitted through the control wires.

Another embodiment of the present invention discloses a multiplexer used in a sensor system, wherein the multiplexer is coupleable to a controller via one or more control wires and one or more sensing wires, and the multiplexer is coupleable to a sensing panel through one or more connecting wire groups. Each of the one or more connecting wire groups comprises one or more connecting wires, and the multiplexer comprises one or more switch groups each coupled between one of the sensing wires and one of the one or more connecting wire groups. Each of the switch groups comprises one or more switches, each of which comprises a first connection terminal, a second connection terminal and a control terminal. The first connection terminal is coupled to the controller via one of the one or more sensing wires. The second connection terminal is coupled to the sensing panel, and the sensing panel comprises one or more sensing areas. The control terminal is coupled to one of the one or more control wires, for receiving one of one or more control signals from the controller.

Another embodiment of the present invention discloses a sensor device, which comprises at least one multiplexer and a controller. The at least one multiplexer is configured to be coupled to one or more sensing areas of a sensing panel through one or more connecting wire groups on the sensing panel, wherein each of the one or more connecting wire groups comprises one or more connecting wires. The controller is configured to be coupled to the at least one multiplexer via one or more control wires and one or more sensing wires. Each of the at least one multiplexer comprises one or more switch groups each coupled between one of the one or more sensing wires and one of the one or more connecting wire groups, and each of the switch groups comprises one or more switches respectively controlled by one or more control signals transmitted through the one or more control wires.

Another embodiment of the present invention discloses a sensing panel apparatus, which is configured to be controlled by a controller and comprises a sensing panel and at least one multiplexer. The sensing panel comprises one or more sensing areas. The at least one multiplexer is coupled to the one or more sensing areas through one or more connecting wire groups on the sensing panel, wherein each of the one or more connecting wire groups comprises one or more connecting wires. Each of the at least one multiplexer comprises one or more switch groups each coupled between one of the one or more sensing wires and one of the one or more connecting wire groups, and each of the switch groups comprises one or more switches respectively controlled by one or more control signals transmitted through the one or more control wires.

Another embodiment of the present invention discloses a controller, which is configured to control a sensing panel apparatus comprising a sensing panel comprising one or more sensing areas, and at least one multiplexer coupled to the one or more sensing areas through one or more connecting wire groups on the sensing panel, wherein each of the one or more connecting wire groups comprises one or more connecting wires, and each of the at least one multiplexer comprises one or more switch groups each coupled between one of the one or more sensing wires and one of the one or more connecting wire groups. The controller comprises one or more pins and control logic. The one or more pins are connected to the at least one multiplexer via one or more control wires and one or more sensing wires. The control logic provides one or more control signals configured to be transmitted through the one of more control wires to respectively control one or more switches in each of the switch groups.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 7A and 7B are schematic diagrams of detailed circuit structures of the multiplexers.

DETAILED DESCRIPTION

Figure 1:
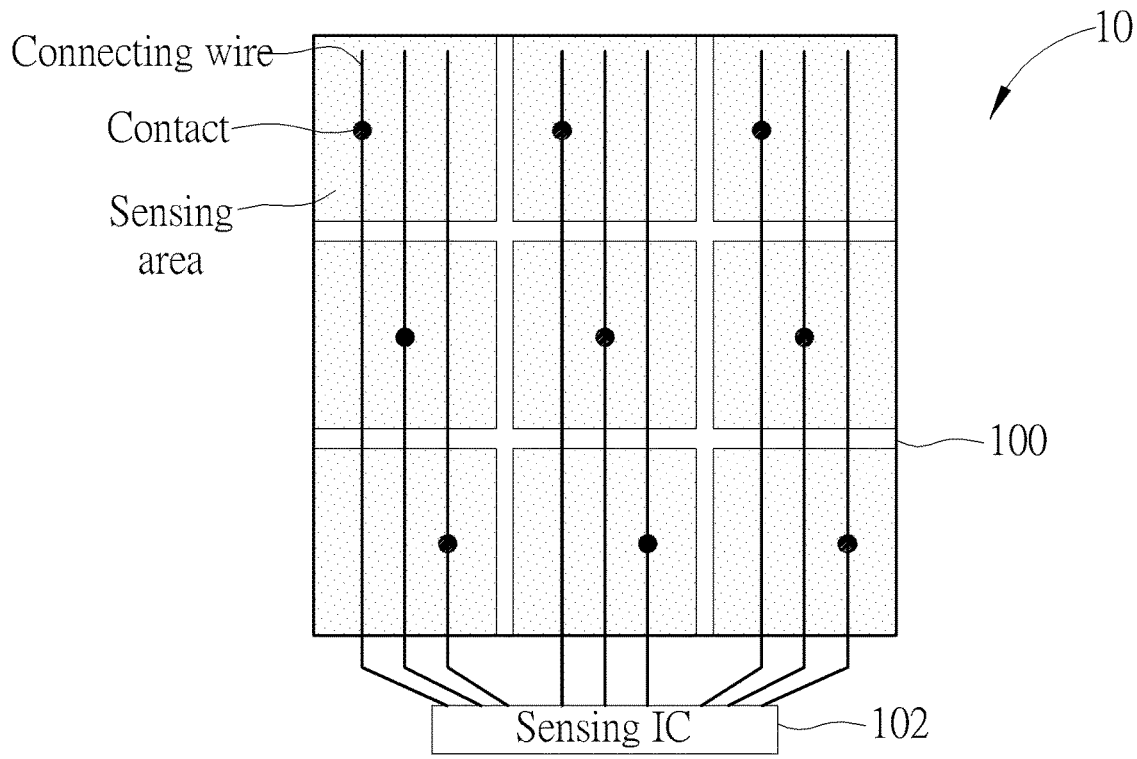
FIG. 1 is a schematic diagram of a general sensor system.
Figure 2:
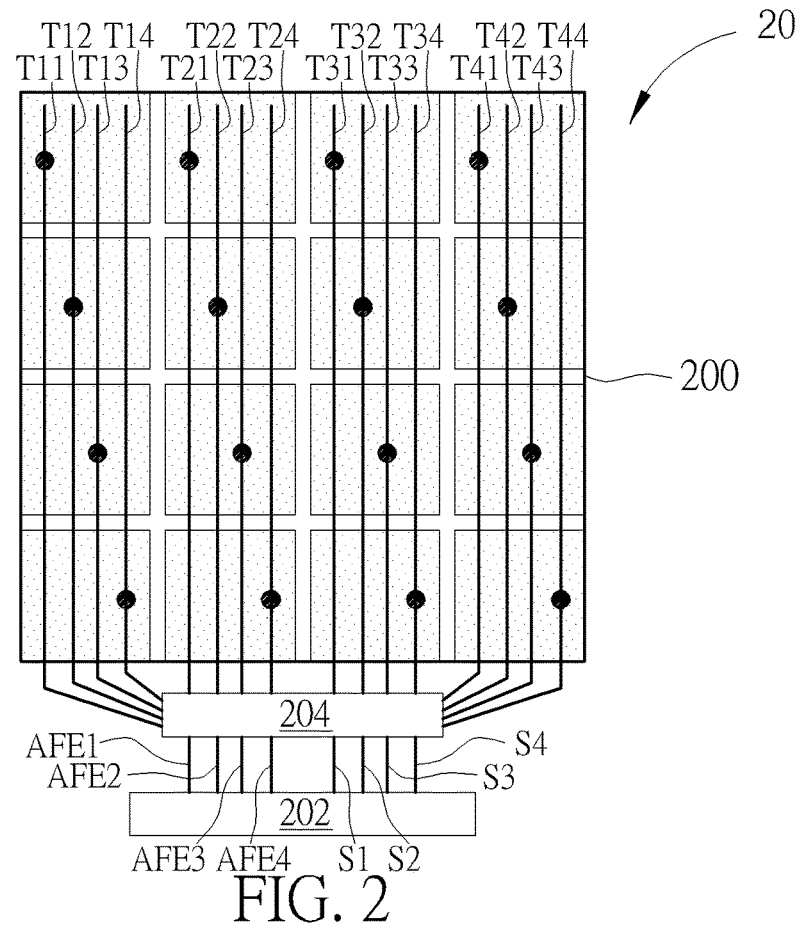
FIG. 2 is a schematic diagram of a sensor system according to an embodiment of the present invention.

Please refer to FIG. 2, which is a schematic diagram of a sensor system 20 according to an embodiment of the present invention. As shown in FIG. 2, the sensor system 20 includes a sensing panel 200, a controller 202 and a multiplexer (MUX) 204. The sensing panel 200 includes 16 sensing areas arranged in a 4×4 array. The controller 202, coupled to the MUX 204, is used for controlling sensing on the sensing panel 200. The controller 202 may be a sensing integrated circuit (IC) or other type of control circuit. The controller 202 may include one or more pins connected to the MUX 204 via one or more control wires and one or more sensing wires. Each pin may be connected to one of the one or more control wires or one of the one or more sensing wires. In this example, the controller 202 has 8 pins connected to the MUX 204, where 4 pins are connected with the control wires S1-S4 and 4 pins are connected with the sensing wires AFE1-AFE4.

Please note that the sensor system 20 may be a biometric sensor system such as a touch sensor system or a fingerprint sensor system. In an embodiment, if the sensor system 20 is a touch sensor system, the sensing panel 200 may be a touch panel, and the controller 202 may be a touch controller such as a touch control IC. In an embodiment, if the sensor system 20 is a fingerprint sensor system, the sensing panel 200 may be a fingerprint sensing panel, and the controller 202 may be a fingerprint sensing circuit such as a fingerprint sensing IC. Further, the sensor system 20 may be configured to perform other types of sensing such as force sensing, pressure sensing or optical sensing, and the sensing panel 200 and the controller 202 may be implemented accordingly to realize the sensing functions.

In detail, the controller 202 may transmit driving signals to the sensing panel 200 (e.g., through the sensing wires AFE1-AFE4 or other driving wires). The driving signals are forwarded to the sensing panel 200 to control the sensing areas on the sensing panel 200. The sensing wires AFE1-AFE4 then transmit sensing signals from the sensing areas to the controller 202. It is noted that in other embodiments, not all of the sensing areas is connected to the controller via the multiplexer(s). In other words, at least one sensing area may be directly connected to the controller.

If the sensor system 20 is a fingerprint sensor system, each sensing area may include one or more fingerprint sensing pixels. The controller 202 may transmit fingerprint control signals as the driving signals, such as bias voltages or currents, to the fingerprint sensing pixels, and correspondingly receive the sensing signals from the pixels through the sensing wires AFE1-AFE4. If the sensor system 20 is a touch sensor system, each sensing area may be a touch sensing electrode. The controller 202 may transmit touch driving signals to the touch sensing electrodes, and correspondingly receive the sensing signals from the electrodes through the sensing wires AFE1-AFE4. As for self-capacitance touch sensing, both the touch driving signals and the touch sensing signals may be transmitted through the sensing wires AFE1-AFE4. As for mutual capacitance touch sensing, the touch sensing signals may be transmitted through the sensing wires AFE1-AFE4 while the touch driving signals may be transmitted through other driving wires.

Please keep referring to FIG. 2. The MUX 204 is coupled between the sensing panel 200 and the controller 202. In detail, the MUX 204 is connected to the sensing areas on the sensing panel 200 via 16 connecting wires T11-T44, each of which is connected to one sensing area via a contact, as shown in FIG. 2. The MUX 204 includes one or more switches. In each of the one or more switches, a first connection terminal is coupled to the controller 202 via a sensing wire, a second connection terminal is coupled to a sensing area on the sensing panel 200, and a control terminal is coupled to a control wire, for receiving a control signal from the controller 202. In other words, each switch is connected between the controller 202 and one of the sensing areas, and receives a control signal from one of the control wires S1-S4. With the implementation and connection of the one or more switches in the MUX 204, the controller 202 is allowed to perform sensing in a specific order by triggering the control wires S1-S4 in an order, where the control wires S1-S4 may control different switches in the MUX 204 to be open or closed.

Please note that several of the one or more switches connected to specific sensing areas (e.g., a row or a column of sensing areas) may receive the same control signal from the same control wire, so that the specific sensing areas may undergo sensing simultaneously. In this manner, the sensing areas are allowed to undergo sensing in a specific order such as row by row or column by column.

Figure 3:
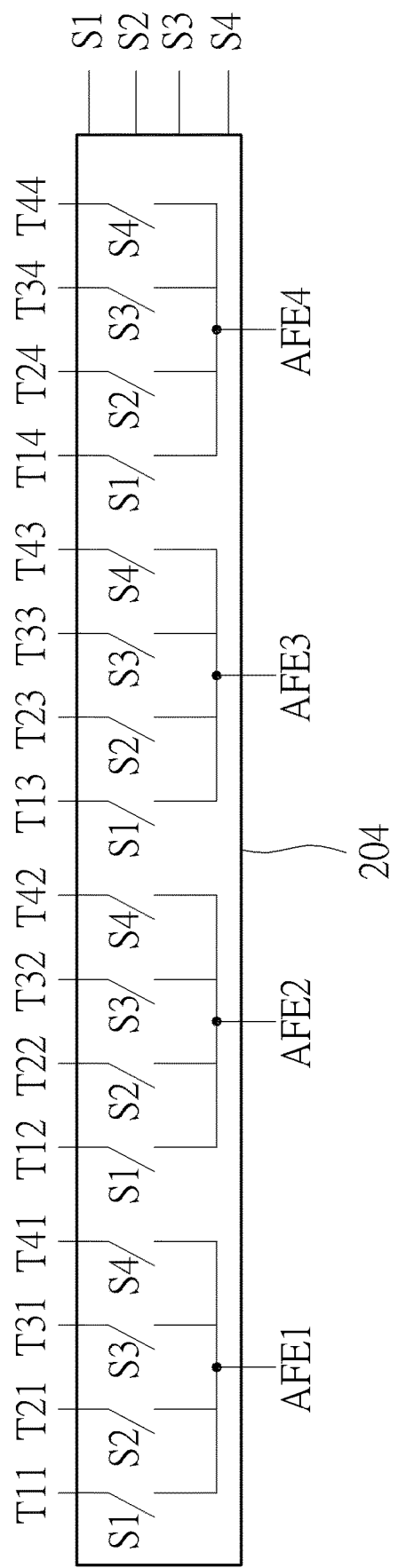
FIG. 3 is a schematic diagram of an exemplary circuit structure of the multiplexer.

An exemplary circuit structure of the MUX 204 is illustrated in FIG. 3. The MUX 204 includes 16 switches coupled to 16 sensing areas on the sensing panel 200 via the connecting wires T11-T44, respectively. These switches are further coupled to the controller 202 via the sensing wires AFE1-AFE4. In detail, 4 switches respectively connected to the connecting wires T11, T21, T31 and T41 on one connection terminal are connected to the sensing wire AFE1 on another connection terminal, 4 switches respectively connected to the connecting wires T12, T22, T32 and T42 on one connection terminal are connected to the sensing wire AFE2 on another connection terminal, 4 switches respectively connected to the connecting wires T13, T23, T33 and T43 on one connection terminal are connected to the sensing wire AFE3 on another connection terminal, and 4 switches respectively connected to the connecting wires T14, T24, T34 and T44 on one connection terminal are connected to the sensing wire AFE4 on another connection terminal. Further, 4 switches respectively connected to the connecting wires T11, T12, T13 and T14 are controlled by a control signal on the control wire S1, 4 switches respectively connected to the connecting wires T21, T22, T23 and T24 are controlled by a control signal on the control wire S2, 4 switches respectively connected to the connecting wires T31, T32, T33 and T34 are controlled by a control signal on the control wire S3, and 4 switches respectively connected to the connecting wires T41, T42, T43 and T44 are controlled by a control signal on the control wire S4. In this manner, the sensing operations on the first column of sensing areas on the sensing panel 200 are controlled by the control wire S1. The sensing operations on the second column of sensing areas on the sensing panel 200 are controlled by the control wire S2. The sensing operations on the third column of sensing areas on the sensing panel 200 are controlled by the control wire S3. The sensing operations on the fourth column of sensing areas on the sensing panel 200 are controlled by the control wire S4.

Figure 4:
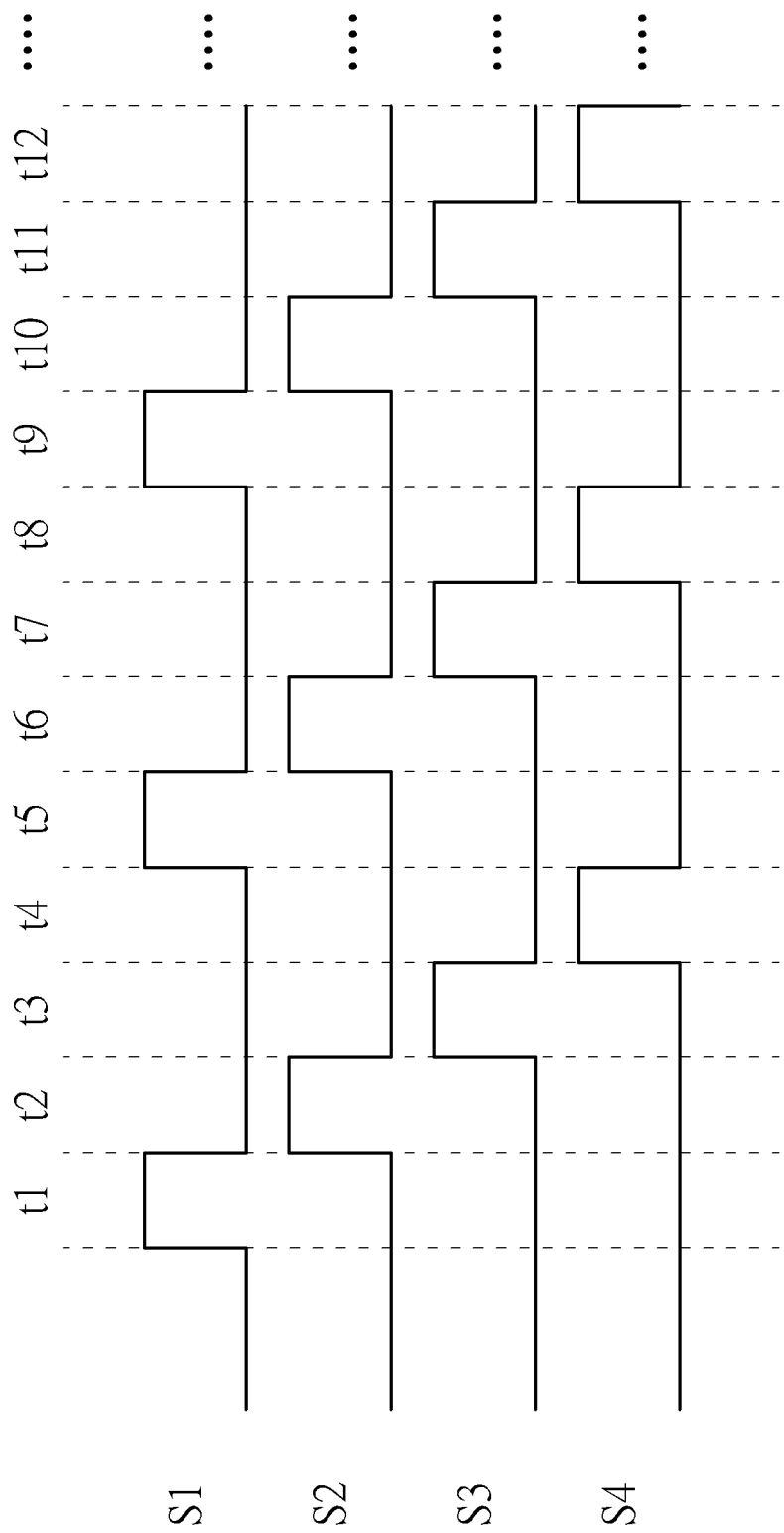
FIG. 4 is a waveform diagram of control signals on the control wires.

Please refer to FIG. 4, which is a waveform diagram of control signals on the control wires S1-S4. As shown in FIG. 4, the control signals are triggered in an order of S1, S2, S3 and S4 in time periods t1-t4. A control signal controls the one or more switches to be open when it is in a lower level, and controls the one or more switches to be closed when it is in a higher level. Please refer to FIG. 4 together with FIG. 3 for detailed descriptions. In the time period t1, the control signal on the control wire S1 is triggered, allowing the sensing wires AFE1-AFE4 to be connected to the connecting wires T11, T12, T13 and T14, respectively. The controller 202 can thereby perform sensing on the first column of sensing areas on the sensing panel 200. In the time period t2, the control signal on the control wire S2 is triggered, allowing the sensing wires AFE1-AFE4 to be connected to the connecting wires T21, T22, T23 and T24, respectively. The controller 202 can thereby perform sensing on the second column of sensing areas on the sensing panel 200. In the time period t3, the control signal on the control wire S3 is triggered, allowing the sensing wires AFE1-AFE4 to be connected to the connecting wires T31, T32, T33 and T34, respectively. The controller 202 can thereby perform sensing on the third column of sensing areas on the sensing panel 200. In the time period t4, the control signal on the control wire S4 is triggered, allowing the sensing wires AFE1-AFE4 to be connected to the connecting wires T41, T42, T43 and T44, respectively. The controller 202 can thereby perform sensing on the fourth column of sensing areas on the sensing panel 200. The controller 202 and the MUX 204 then repeat their operations in time periods t5-t8, t9-t12, and so on. In this manner, the controller 202 may control the MUX 204, in order to perform sensing on the sensing areas column by column. The sensing operations for the entire sensing areas can be accomplished in 4 time periods.

Please note that according to the embodiments of the present invention, the pin number of the controller may be reduced. With a conventional wire connection method without the usage of any MUXs in the prior art, a sensing panel having 16 sensing areas arranged in a 4×4 array needs 16 connecting wires for the sensing operations on the sensing areas. Therefore, 16 I/O pins on the sensing IC is necessary. In contrast, in the embodiment shown in FIG. 2, the controller 202 has only 8 pins connected to the MUX 204, where 4 pins are connected with the control wires S1-S4 and 4 pins are connected with the sensing wires AFE1-AFE4. Note that the MUX 204 may be an analog MUX fabricated on the substrate of the sensing panel 200, such as a glass substrate or flexible substrate, with a panel process. When the MUX 204 is implemented on the substrate with the panel process, the controller 202, which is usually implemented by a sensing IC, only requires 8 I/O pins. The reduced pin number decreases the die size of the sensing IC, and thereby reduces the cost. With the decreased pin number, there may be more space for the bonding pitch in each I/O pin; this enhances the wire bonding quality of the sensing IC.

Figure 5:
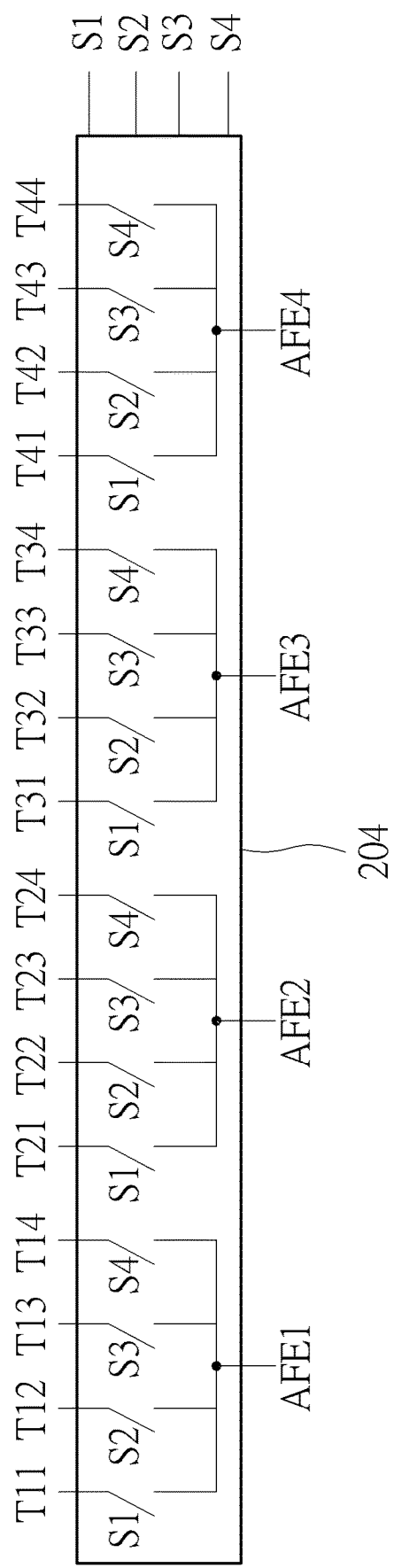
FIG. 5 is a schematic diagram of another exemplary circuit structure of the multiplexer.

In another embodiment, the controller 202 may also perform sensing on the sensing areas row by row. For example, please refer to FIG. 5, which is a schematic diagram of another exemplary circuit structure of the MUX 204. As shown in FIG. 5, the MUX 204 also includes 16 switches coupled to 16 sensing areas on the sensing panel 200 via the connecting wires T11-T44, respectively. These switches are further coupled to the controller 202 via the sensing wires AFE1-AFE4. In detail, 4 switches respectively connected to the connecting wires T11, T12, T13 and T14 on one connection terminal are connected to the sensing wire AFE1 on another connection terminal, 4 switches respectively connected to the connecting wires T21, T22, T23 and T24 on one connection terminal are connected to the sensing wire AFE2 on another connection terminal, 4 switches respectively connected to the connecting wires T31, T32, T33 and T34 on one connection terminal are connected to the sensing wire AFE3 on another connection terminal, and 2 switches respectively connected to the connecting wires T41, T42, T43 and T44 on one connection terminal are connected to the sensing wire AFE4 on another connection terminal. Further, 4 switches respectively connected to the connecting wires T11, T21, T31 and T41 are controlled by a control signal on the control wire S1, 4 switches respectively connected to the connecting wires T12, T22, T32 and T42 are controlled by a control signal on the control wire S2, 4 switches respectively connected to the connecting wires T13, T23, T33 and T43 are controlled by a control signal on the control wire S3, and 4 switches respectively connected to the connecting wires T14, T24, T34 and T44 are controlled by a control signal on the control wire S4. In this manner, the sensing operations on the first row of sensing areas on the sensing panel 200 are controlled by the control wire S1. The sensing operations on the second row of sensing areas on the sensing panel 200 are controlled by the control wire S2. The sensing operations on the third row of sensing areas on the sensing panel 200 are controlled by the control wire S3. The sensing operations on the fourth row of sensing areas on the sensing panel 200 are controlled by the control wire S4.

Please refer to FIG. 5 together with FIG. 4 for detailed descriptions. In the time period t1, the control signal on the control wire S1 is triggered, allowing the sensing wires AFE1-AFE4 to be connected to the connecting wires T11, T21, T31 and T41, respectively. The controller 202 can thereby perform sensing on the first row of sensing areas on the sensing panel 200. In the time period t2, the control signal on the control wire S2 is triggered, allowing the sensing wires AFE1-AFE4 to be connected to the connecting wires T12, T22, T32 and T42, respectively. The controller 202 can thereby perform sensing on the second row of sensing areas on the sensing panel 200. In the time period t3, the control signal on the control wire S3 is triggered, allowing the sensing wires AFE1-AFE4 to be connected to the connecting wires T13, T23, T33 and T43, respectively. The controller 202 can thereby perform sensing on the third row of sensing areas on the sensing panel 200. In the time period t4, the control signal on the control wire S4 is triggered, allowing the sensing wires AFE1-AFE4 to be connected to the connecting wires T14, T24, T34 and T44, respectively. The controller 202 can thereby perform sensing on the fourth row of sensing areas on the sensing panel 200. The controller 202 and the MUX 204 then repeat their operations in time periods t5-t8, t9-t12, and so on. In this manner, the controller 202 may control the MUX 204, in order to perform sensing on the sensing areas row by row. The sensing operations for the entire sensing areas can be accomplished in 4 time periods.

Please note that the present invention provides a circuit structure of a sensor system having a MUX disposed between the controller and the sensing panel. The pin number of the controller can therefore be reduced with the MUX implemented on the substrate of the sensing panel. Those skilled in the art can make modifications and alternations accordingly. For example, as shown in the above embodiments, the connections of the one or more switches in the MUX may be arranged in a specific manner to perform sensing row by row or column by column. In another embodiment, the sensing operations may be performed by other methods. For example, the second column of sensing areas may undergo sensing before the first column of sensing areas, or the third row of sensing areas may undergo sensing next to the first row of sensing areas. Alternatively, the sensing operations may be performed on the sensing areas in any possible orders other than the row-by-row and column-by-column manners. In addition, the circuit structure of the sensing panel 200 and the MUX 204 shown in FIG. 2 is only one of various possible implementations. For example, in the sensing panel 200 shown in FIG. 2, each of the connecting wires T11-T44 extends from the MUX 204 to the upper side of the sensing panel 200 and has the same length. This arrangement allows each of the connecting wires T11-T44 to have similar resistance-capacitance (RC) characteristics. In another embodiment, the connecting wires T11-T44 may have different lengths, as long as each of the connecting wires T11-T44 is long enough to connect with the corresponding sensing area. Furthermore, there is only one MUX 204 in the embodiment shown in FIG. 2, but in another embodiment, there may be more than one MUX disposed between the sensing panel and the controller.

Figure 6:
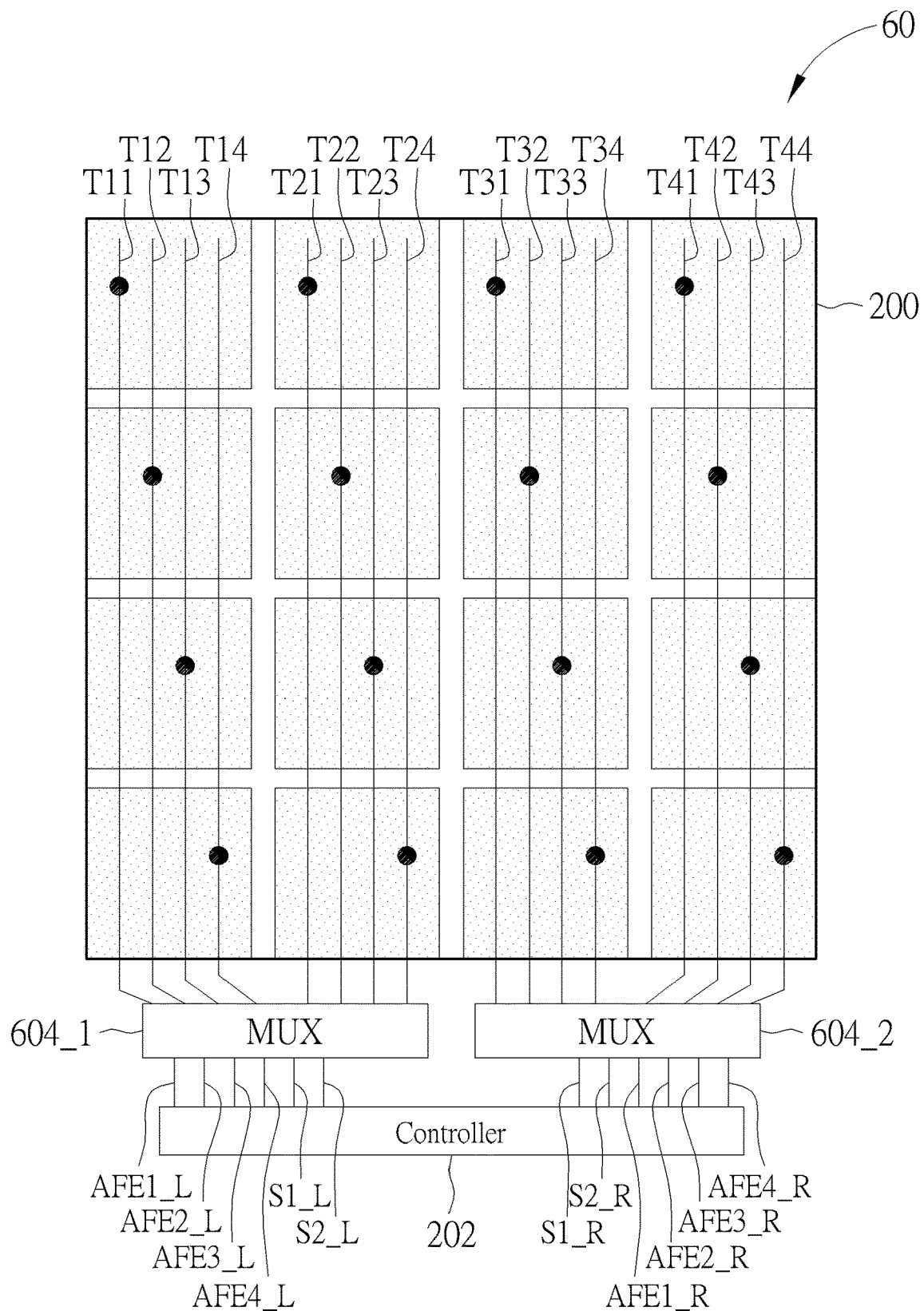
FIG. 6 is a schematic diagram of another sensor system according to an embodiment of the present invention.

For example, please refer to FIG. 6, which is a schematic diagram of another sensor system 60 according to an embodiment of the present invention. As shown in FIG. 6, the circuit structure of the sensor system 60 is similar to that of the sensor system 20; hence, circuit elements and signals having similar functions are denoted by the same symbols. A main difference between the sensor system 60 and the sensor system 20 is that the sensor system 60 has two MUXs 604_1 and 604_2 while the sensor system 20 has only one MUX 204. The sensor system 60 also includes 16 sensing areas arranged in a 4×4 array, and each of the sensing areas are connected to the MUX 604_1 or 604_2 via 16 connecting wires T11-T44, respectively. More specifically, the connecting wires T11, T12, T13, T14, T21, T22, T23 and T24 connect the sensing areas located on the left half of the sensing panel 200 to the MUX 604_1, and the connecting wires T31, T32, T33, T34, T41, T42, T43 and T44 connect the sensing areas located on the right half of the sensing panel 200 to the MUX 604_2. The MUX 604_1 is further connected to the controller 202 via control wires S1_L and S2_L and sensing wires AFE1_L-AFE4_L. The MUX 604_2 is further connected to the controller 202 via control wires S1_R and S2_R and sensing wires AFE1_R-AFE4_R. In this case, the controller 202 has totally 12 pins connected to the MUXs 604_1 and 604_2, where 4 pins are connected with the control wires S1_L, S2_L, S1_R and S2_R, and 8 pins are connected with the sensing wires AFE1_L-AFE4_L and AFE1_R-AFE4_R. In this case, the pin number of the controller 202 is still fewer than that in the prior art.

Please refer to FIGS. 7A and 7B for detailed circuit structures of the MUXs 604_1 and 604_2. As shown in FIG. 7A, the MUX 604_1 includes 8 switches coupled to 8 sensing areas on the left half of the sensing panel 200 via the connecting wires T11, T12, T13, T14, T21, T22, T23 and T24, respectively. These switches are further coupled to the controller 202 via the sensing wires AFE1_L-AFE4_L. In detail, 2 switches respectively connected to the connecting wires T11 and T21 on one connection terminal are connected to the sensing wire AFE1_L on another connection terminal, 2 switches respectively connected to the connecting wires T12 and T22 on one connection terminal are connected to the sensing wire AFE2_L on another connection terminal, 2 switches respectively connected to the connecting wires T13 and T23 on one connection terminal are connected to the sensing wire AFE3_L on another connection terminal, and 2 switches respectively connected to the connecting wires T14 and T24 on one connection terminal are connected to the sensing wire AFE4_L on another connection terminal. Further, 4 switches respectively connected to the connecting wires T11, T12, T13 and T14 are controlled by a control signal on the control wire S1_L, and 4 switches respectively connected to the connecting wires T21, T22, T23 and T24 are controlled by a control signal on the control wire S2_L. In this manner, the sensing operations on the first column of sensing areas on the sensing panel 200 are controlled by the control wire S1_L. The sensing operations on the second column of sensing areas on the sensing panel 200 are controlled by the control wire S2_L.

As shown in FIG. 7B, the MUX 604_2 includes 8 switches coupled to 8 sensing areas on the right half of the sensing panel 200 via the connecting wires T31, T32, T33, T34, T41, T42, T43 and T44, respectively. These switches are further coupled to the controller 202 via the sensing wires AFE1_R-AFE4_R. In detail, 2 switches respectively connected to the connecting wires T31 and T41 on one connection terminal are connected to the sensing wire AFE1_R on another connection terminal, 2 switches respectively connected to the connecting wires T32 and T42 on one connection terminal are connected to the sensing wire AFE2_R on another connection terminal, 2 switches respectively connected to the connecting wires T33 and T43 on one connection terminal are connected to the sensing wire AFE3_R on another connection terminal, and 2 switches respectively connected to the connecting wires T34 and T44 on one connection terminal are connected to the sensing wire AFE4_R on another connection terminal. Further, 4 switches respectively connected to the connecting wires T31, T32, T33 and T34 are controlled by a control signal on the control wire S1_R, and 4 switches respectively connected to the connecting wires T41, T42, T43 and T44 are controlled by a control signal on the control wire S2_R. In this manner, the sensing operations on the third column of sensing areas on the sensing panel 200 are controlled by the control wire S1_R. The sensing operations on the fourth column of sensing areas on the sensing panel 200 are controlled by the control wire S2_R.

Figure 8:
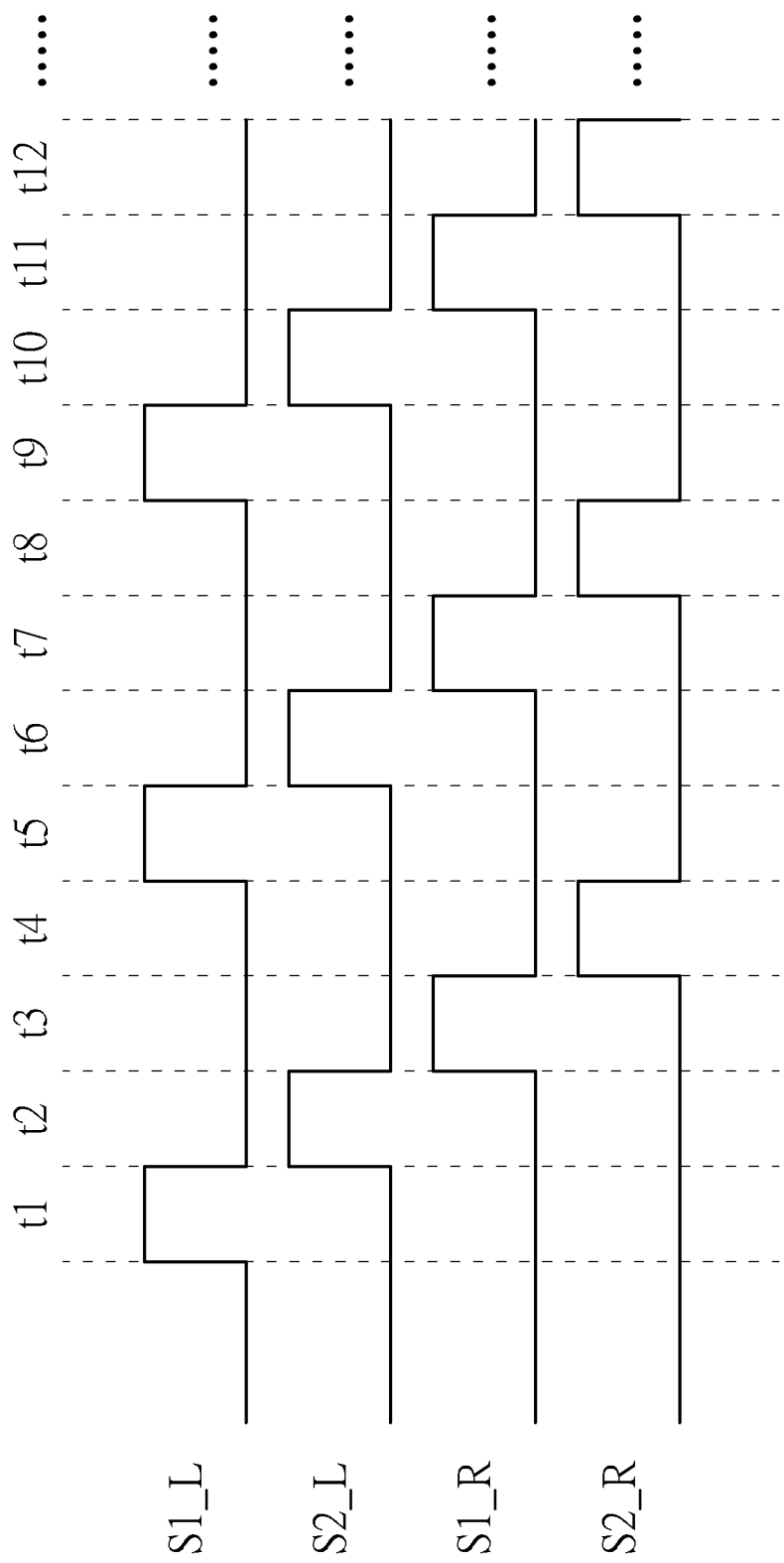
FIG. 8 is a waveform diagram of control signals on the control wires.

Please refer to FIG. 8, which is a waveform diagram of control signals on the control wires S1_L, S2_L, S1_R and S2_R. As shown in FIG. 8, the control signals are triggered in an order of S1_L, S2_L, S1_R and S2_R in time periods t1-t4. A control signal controls the one or more switches to be open when it is in a lower level, and controls the one or more switches to be closed when it is in a higher level. Please refer to FIG. 8 together with FIGS. 7A and 7B for detailed descriptions. In the time period t1, the control signal on the control wire S1_L is triggered, allowing the sensing wires AFE1_L-AFE4_L to be connected to the connecting wires T11, T12, T13 and T14, respectively. The controller 202 can thereby perform sensing on the first column of sensing areas on the sensing panel 200. In the time period t2, the control signal on the control wire S2_L is triggered, allowing the sensing wires AFE1_L-AFE4_L to be connected to the connecting wires T21, T22, T23 and T24, respectively. The controller 202 can thereby perform sensing on the second column of sensing areas on the sensing panel 200. In the time period t3, the control signal on the control wire S1_R is triggered, allowing the sensing wires AFE1_R-AFE4_R to be connected to the connecting wires T31, T32, T33 and T34, respectively. The controller 202 can thereby perform sensing on the third column of sensing areas on the sensing panel 200. In the time period t4, the control signal on the control wire S2_R is triggered, allowing the sensing wires AFE1_R-AFE4_R to be connected to the connecting wires T41, T42, T43 and T44, respectively. The controller 202 can thereby perform sensing on the fourth column of sensing areas on the sensing panel 200. The controller 202 and the MUXs 604_1 and 604_2 then repeat their operations in time periods t5-t8, t9-t12, and so on. In this manner, the controller 202 may control the MUXs 604_1 and 604_2 to perform sensing on the sensing areas column by column. The sensing operations for the entire sensing areas can be accomplished in 4 time periods.

In another embodiment, in a sensor system having at least two MUXs, the sensing may be performed on at least two columns or two rows of sensing areas simultaneously. Therefore, the controller may control the MUXs to perform sensing on at least two columns or two rows of sensing areas simultaneously by triggering control signals on different control wires simultaneously. In this manner, the sensing operations may be performed in a faster speed, so that the performance of the sensor system may be enhanced.

Figure 9:
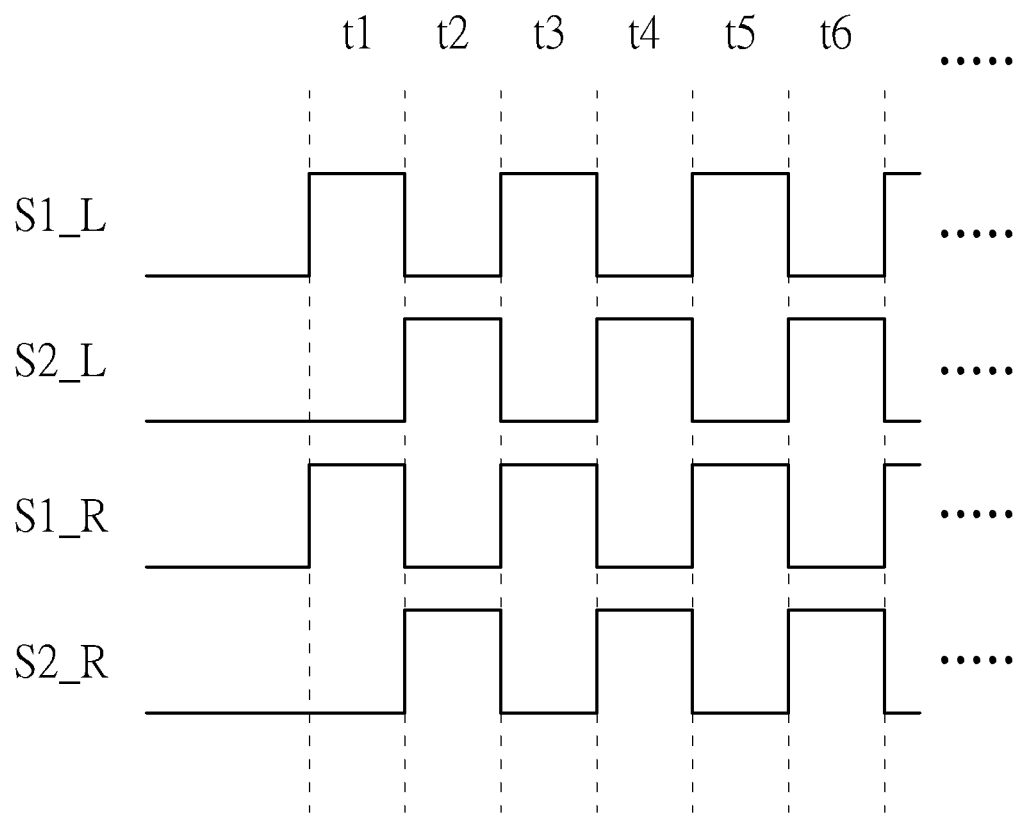
FIG. 9 is a waveform diagram of control signals on the control wires according to another embodiment of the present invention.

For example, please refer to FIG. 9, which is a waveform diagram of control signals on the control wires S1_L, S2_L, S1_R and S2_R according to another embodiment of the present invention. As shown in FIG. 9, the control signals on the control wires S1_L and S1_R are triggered simultaneously, and the control signals on the control wires S2_L and S2_R are trigger simultaneously. In such a situation, in the time period t1, the control signals on the control wires S1_L and S1_R are triggered; this allows the sensing wires AFE1_L-AFE4_L to be connected to the connecting wires T11, T12, T13 and T14, respectively, and allows the sensing wires AFE1_R-AFE4_R to be connected to the connecting wires T31, T32, T33 and T34, respectively. The controller 202 can thereby perform sensing on the first and third columns of sensing areas on the sensing panel 200 simultaneously. In the time period t2, the control signals on the control wires S2_L and S2_R are triggered; this allows the sensing wires AFE1_L-AFE4_L to be connected to the connecting wires T21, T22, T23 and T24, respectively, and allows the sensing wires AFE1_R-AFE4_R to be connected to the connecting wires T41, T42, T43 and T44, respectively. The controller 202 can thereby perform sensing on the second and fourth columns of sensing areas on the sensing panel 200 simultaneously. The controller 202 and the MUXs 604_1 and 604_2 then repeat their operations in time periods t3-t4, t5-t6, and so on. In this manner, the controller 202 may control the MUXs 604_1 and 604_2 to perform sensing on two columns of sensing areas simultaneously. The sensing operations for the entire sensing areas can be accomplished in 2 time periods. As a result, the speed of sensing operations can be increased.

Based on the above embodiments and illustrations shown in FIGS. 2-9, those skilled in the art can derive the operations of performing sensing on at least two rows of sensing areas simultaneously. The detailed operations will not be narrated herein.

Please note that the operational speed of sensing can be increased with an increasing number of MUXs. For example, if there are 4 MUXs in a sensor system, there may be 4 columns or 4 rows of sensing areas undergoing sensing operations simultaneously. However, the increasing number of MUXs may be followed by an increasing number of I/O pins in the controller. Those skilled in the art are allowed to make a selection between a higher operational speed and fewer number of I/O pins according to system requirements. Therefore, the circuit structure and wire connection of the MUX (s) may be arranged to realize any possible orders of sensing operations; this should not be limited herein.

Figure 10:
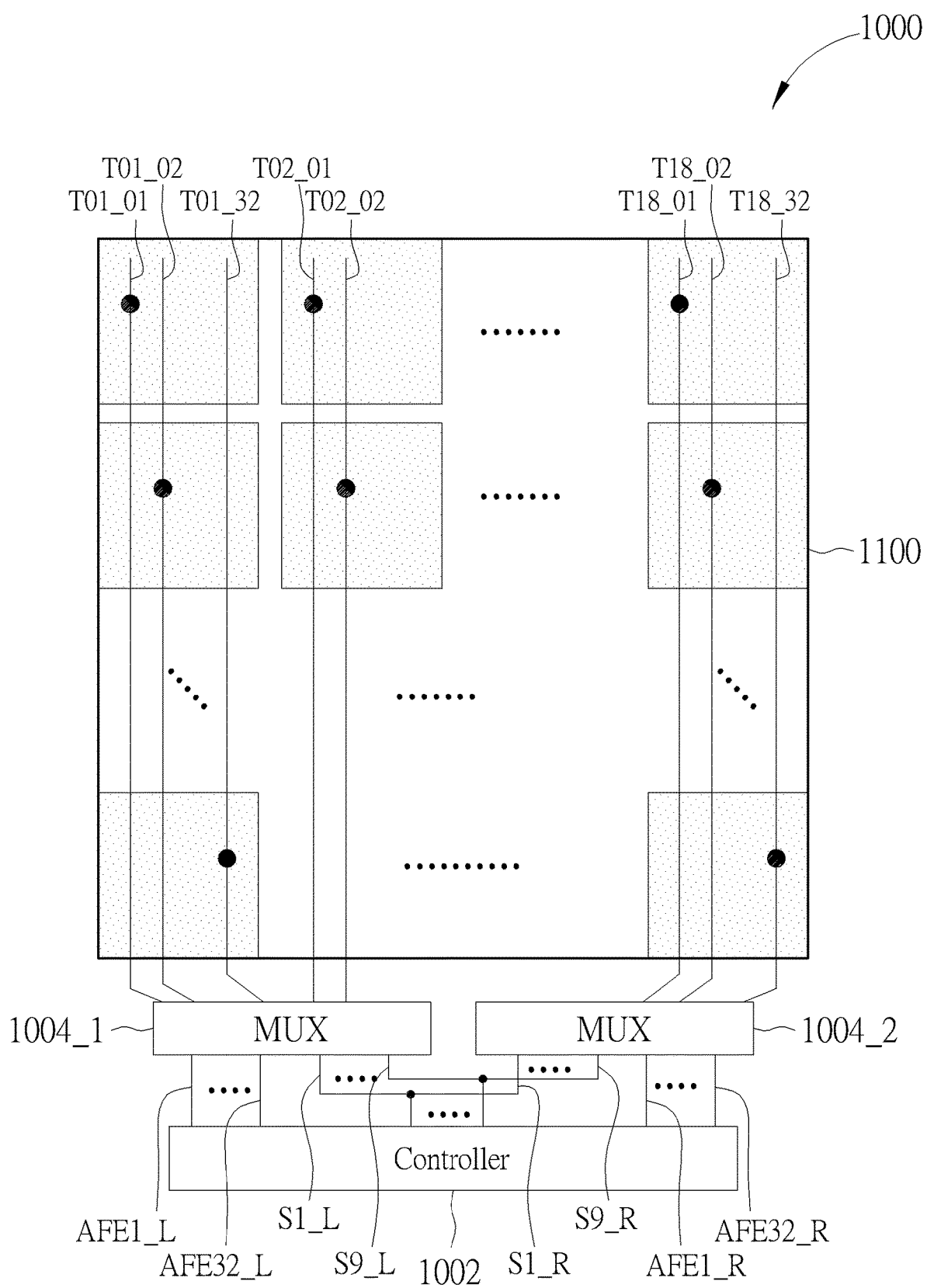
FIG. 10 is a schematic diagram of a sensor system according to an embodiment of the present invention.

Please refer to FIG. 10, which is a schematic diagram of a sensor system 1000 according to an embodiment of the present invention. As shown in FIG. 10, the sensor system 1000 includes a sensing panel 1100, a controller 1002 and MUXs 1004_1 and 1004_2. The sensing panel 1100 is a large sensing panel having 576 sensing areas arranged in a 32×18 array, i.e., there are 32 rows and 18 columns of sensing areas. These sensing areas are connected to the MUXs 1004_1 or 1004_2 via 576 connecting wires T01_01-T18_32, respectively. More specifically, the connecting wires T01_01-T09_32 connect the sensing areas located on the left half of the sensing panel 1100 to the MUX 1004_1, and the connecting wires T10_01-T18_32 connect the sensing areas located on the right half of the sensing panel 1100 to the MUX 1004_2. The MUX 1004_1 is further connected to the controller 1002 via control wires S1_L-S9_L and sensing wires AFE1_L-AFE32_L. The MUX 1004_2 is further connected to the controller 1002 via control wires S1_R-S9_R and sensing wires AFE1_R-AFE32_R.

Figure 11A:
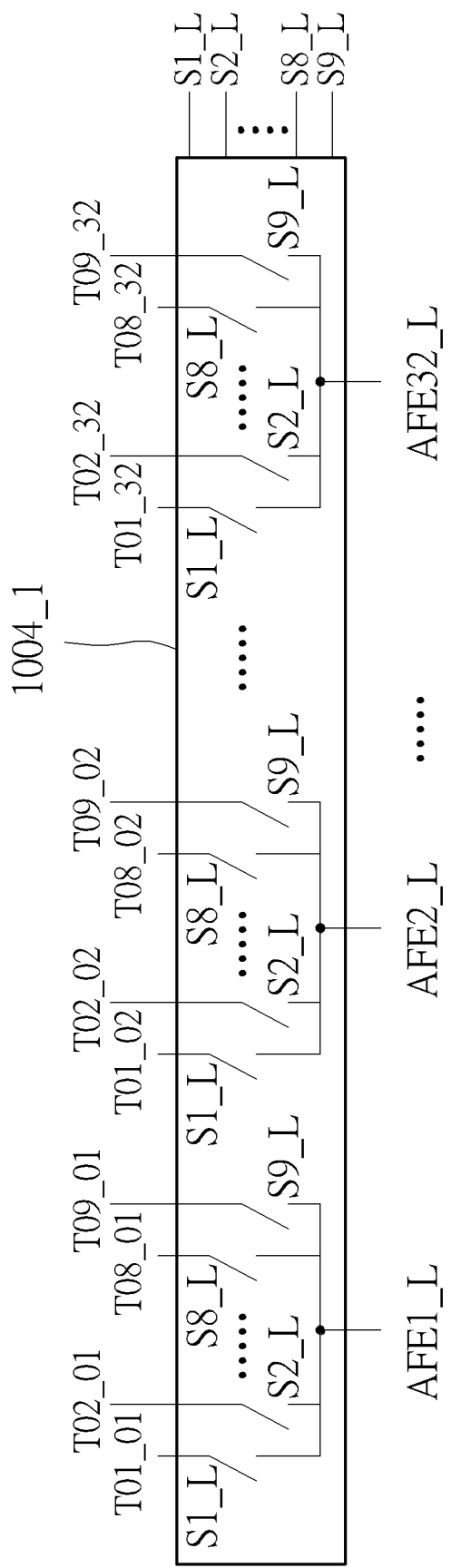
FIGS. 11A and 11B are schematic diagrams of detailed circuit structures of the multiplexers.
Figure 11B:
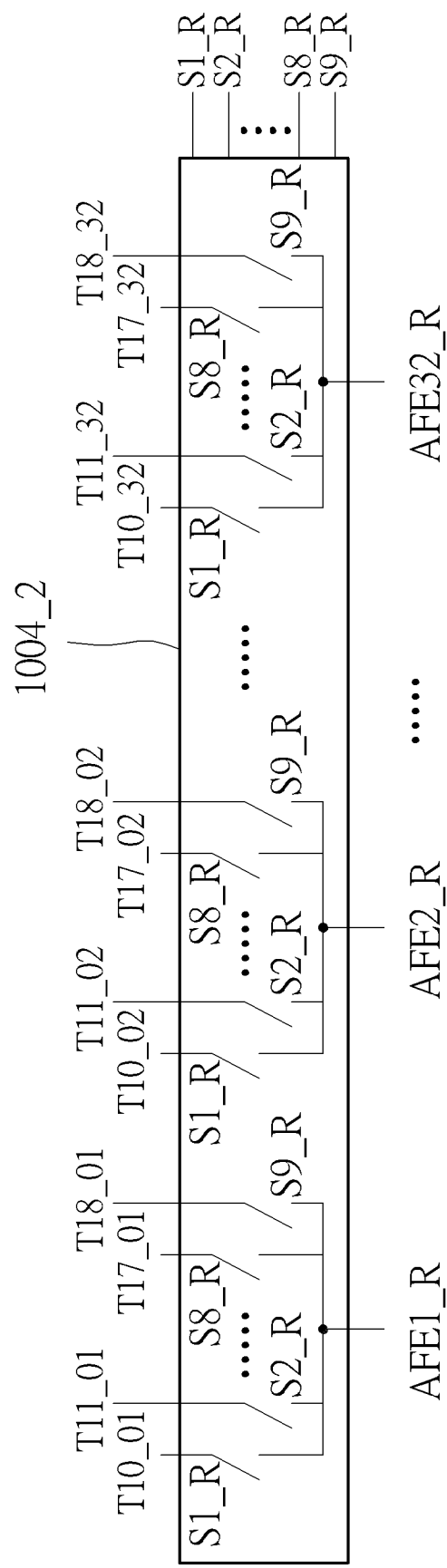

Please refer to FIGS. 11A and 11B for detailed circuit structures of the MUXs 1004_1 and 1004_2. As shown in FIG. 11A, the MUX 1004_1 includes 9×32 switches coupled to 288 sensing areas on the left half of the sensing panel 1100 via the connecting wires T01_01-T09_32, respectively. These switches are further coupled to the controller 1002 via the sensing wires AFE1_L-AFE32_L. In detail, 9 switches respectively connected to the connecting wires T01_01-T09_01 on one connection terminal are connected to the sensing wire AFE1_L on another connection terminal, 9 switches respectively connected to the connecting wires T01_02-T09_02 on one connection terminal are connected to the sensing wire AFE2_L on another connection terminal, and so on. Finally, 9 switches respectively connected to the connecting wires T1_32-T09_32 on one connection terminal are connected to the sensing wire AFE32_L on another connection terminal. Further, 32 switches respectively connected to the connecting wires T01_01-T01_32 are controlled by a control signal on the control wire S1_L, 32 switches respectively connected to the connecting wires T02_01-T02_32 are controlled by a control signal on the control wire S2_L, and so on. Finally, 32 switches respectively connected to the connecting wires T09_01-T09_32 are controlled by a control signal on the control wire S9_L. In this manner, the sensing operations on the first to ninth columns of sensing areas on the sensing panel 1100 are controlled by the control wires S1_L-S9_L, respectively.

As shown in FIG. 11B, the MUX 1004_2 includes 9×32 switches coupled to 288 sensing areas on the right half of the sensing panel 1100 via the connecting wires T10_01-T18_32, respectively. These switches are further coupled to the controller 1002 via the sensing wires AFE1_R-AFE32_R. In detail, 9 switches respectively connected to the connecting wires T10_01-T18_01 on one connection terminal are connected to the sensing wire AFE1_R on another connection terminal, switches respectively connected to the connecting wires T10_02-T18_02 on one connection terminal are connected to the sensing wire AFE2_R on another connection terminal, and so on. Finally, 9 switches respectively connected to the connecting wires T10_32-T18_32 on one connection terminal are connected to the sensing wire AFE32_R on another connection terminal. Further, 32 switches respectively connected to the connecting wires T10_01-T10_32 are controlled by a control signal on the control wire S1_R, 32 switches respectively connected to the connecting wires T11_01-T11_32 are controlled by a control signal on the control wire S2_R, and so on. Finally, 32 switches respectively connected to the connecting wires T18_01-T18_32 are controlled by a control signal on the control wire S9_R. In this manner, the sensing operations on the tenth to eighteenth columns of sensing areas on the sensing panel 1100 are controlled by the control wires S1_R-S9_R, respectively.

Figure 12:
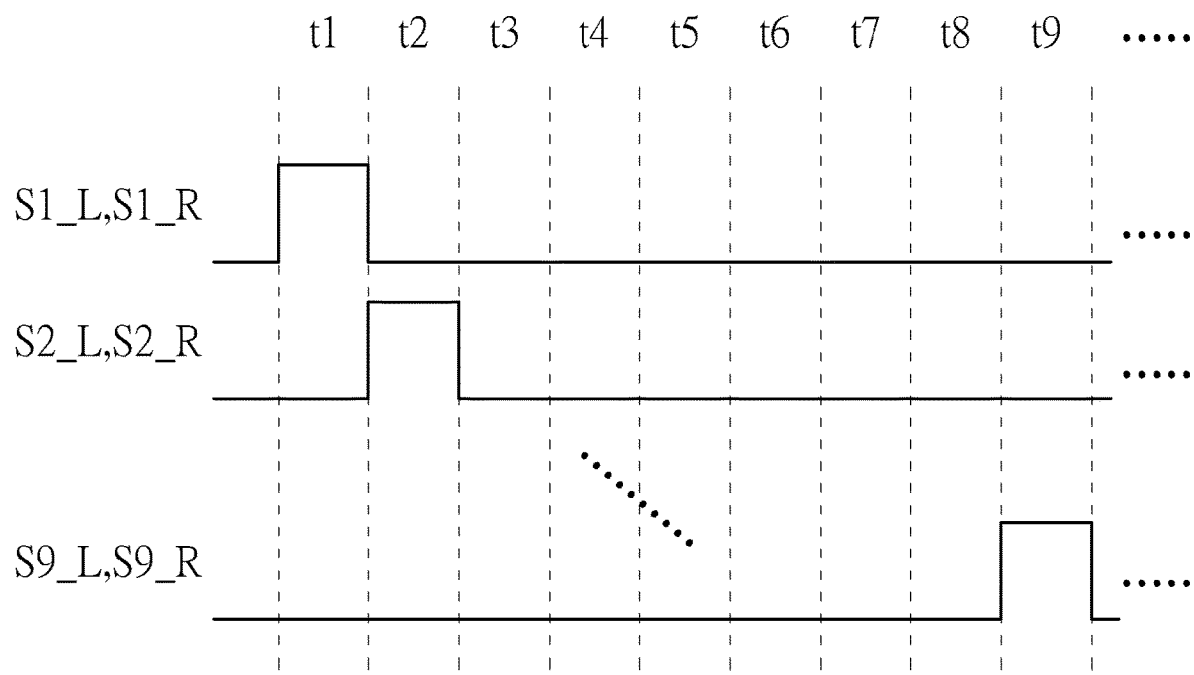
FIG. 12 is a waveform diagram of control signals on the control wires.

Please refer to FIG. 12, which is a waveform diagram of control signals on the control wires S1_L-S9_L and S1_R-S9_R. As shown in FIG. 12, the control signals on the control wires S1_L and S1_R are triggered simultaneously, and the control signals on the control wires S2_L and S2_R are trigger simultaneously, and so on. In such a situation, in the time period t1, the control signals on the control wires S1_L and S1_R are triggered; this allows the sensing wires AFE1_L-AFE32_L to be connected to the connecting wires T01_01-T01_32, respectively, and allows the sensing wires AFE1_R-AFE32_R to be connected to the connecting wires T10_01-T10_32, respectively. The controller 1002 can thereby perform sensing on the first and tenth columns of sensing areas on the sensing panel 1100 simultaneously. In the time period t2, the control signals on the control wires S2_L and S2_R are triggered; this allows the sensing wires AFE1_L-AFE32_L to be connected to the connecting wires T02_01-T02_32, respectively, and allows the sensing wires AFE1_R-AFE32_R to be connected to the connecting wires T T11_01-T11_32, respectively. The controller 1002 can thereby perform sensing on the second and eleventh columns of sensing areas on the sensing panel 1100 simultaneously. Those skilled in the art should be able to derive the operations in time periods t3-t9 according to the above descriptions and the illustrations in FIGS. 11A, 11B and 12; these will not be narrated herein. The controller 1002 and the MUXs 1004_1 and 1004_2 then repeat their operations after the time period t9. In this manner, the controller 1002 may control the MUXs 1004_1 and 1004_2 to perform sensing on two columns of sensing areas simultaneously. The sensing operations for the entire sensing areas can be accomplished in 9 time periods.

Please note that, since the control signals on the control wires S1_L-S9_L and S1_R-S9_R can be triggered simultaneously, the control wires S1_L-S9_L can be connected to the control wires S1_R-S9_R, respectively, in order to save the pin number, as shown in FIG. 10. In such a situation, the controller 1002 has 9 pins connected to the control wires S1_L-S9_L and S1_R-S9_R. Therefore, in the embodiment shown in FIG. 10, the controller 1002 has totally 73 pins connected to the MUXs 1004_1 and 1004_2, where 9 pins are connected with the control wires S1_L-S9_L and S1_R-S9_R and 64 pins are connected with the sensing wires AFE1_L-AFE32_L and AFE1_R-AFE32_R. In contrast to the prior art where a sensing IC for a sensing panel having sensing areas arranged in a 32×18 array requires 576 I/O pins, the embodiment of the present invention may reduce the pin number to 73. This significant reduction of pin number leads to tremendous benefits of cost saving and bonding quality improvement.

It should also be noted that, in the above embodiments, the MUXs are coupled to the sensing wires, and thus the operations associated with the MUXs are served to deal with the sensing signals forwarded via the sensing wires. As mentioned above, in addition to receiving the sensing signals from the sensing panel, the controller may further transmit driving signals to the sensing panel. The implementations and operations of the MUXs according to the embodiments of the present invention may also be applicable to these driving signals, which may include touch driving signals and/or fingerprint control signals. In such a situation, the MUXs may be coupled to the related driving wires and/or control wires. An exemplary implementation may be realized by coupling the MUXs to the driving wires or control wires in a manner similar to the implementation of coupling the MUXs to the sensing wires as shown in FIGS. 3, 5, 7A-7B or 11A-11B.

Figure 13:
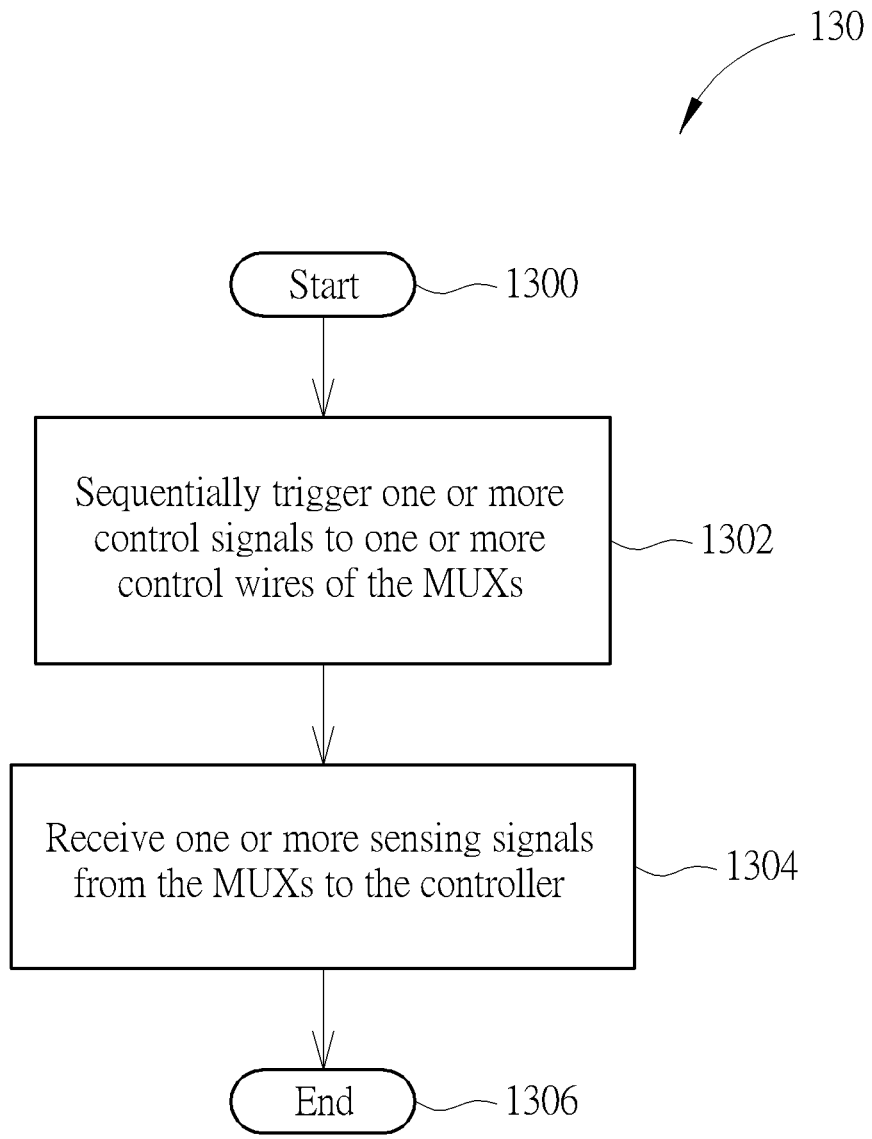
FIG. 13 is a flowchart of a process according to an embodiment of the present invention.

The abovementioned operations of the controllers 202 and 1002 may be summarized into a process 130, as shown in FIG. 13. The process 130 may be applied to a controller of a sensor system having one or more MUXs, for reducing the pin number of the controller. The process 130 includes the following steps:

Step 1300: Start.

Step 1302: Sequentially trigger one or more control signals to one or more control wires of the MUXs.

Step 1304: Receive one or more sensing signals from the MUXs to the controller.

Step 1306: End.

The detailed operations and alternations of the process 130 are illustrated in the above descriptions, and will not be narrated hereinafter.

It is noted that the disclosure may be applied to different types of sensor systems such as mutual capacitance sensor system and self-capacitance sensor system. For example, for a mutual capacitance sensor system, the connecting wires may include one or both of a first type of connecting wires configured to pass driving signals and a second type of connecting wires configured to pass sensing signals. The driving signals may be coupled to one or more first multiplexers, which may be coupled to the controller. Additionally or alternatively, the sensing signals may be coupled to one or more second multiplexers, which may be coupled to the controller. In addition, the disclosure may not be limited to sensor system but may be applied to other types of sensor system. In other words, the sensing panel can be other types of panel such as a fingerprint panel, a touch panel, or a multi-functional panel such as a display panel integrated with touch and/or fingerprint sensing functions. Furthermore, the controller may include other types of sensor controller such as fingerprint sensor.

To sum up, the present invention provides a sensor system with a MUX disposed between the controller and the sensing panel, for reducing the pin number of the controller. The MUX may be an analog MUX fabricated on the substrate of the sensing panel with a panel process. Therefore, the pin number of the controller, which is usually implemented by a sensing IC, can be significantly reduced. The reduced pin number decreases the die size of the sensing IC, and thereby reduces the cost. With the decreased pin number, there may be more space for the bonding pitch in each I/O pin; this enhances the wire bonding quality of the sensing IC. Further, the sensor system may include more than one MUX, where at least two columns or two rows of sensing areas may undergo sensing simultaneously. This increases the speed of sensing operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensor system, comprising:
   a sensing panel, comprising one or more sensing areas;
   at least one multiplexer, coupled to the one or more sensing areas through one or more connecting wire groups on the sensing panel, wherein each of the one or more connecting wire groups comprises one or more connecting wires; and
   a controller, coupled to the at least one multiplexer via one or more control wires and one or more sensing wires;
   wherein each of the at least one multiplexer comprises one or more switch groups each coupled between one of the one or more sensing wires and one of the one or more connecting wire groups, and each of the switch groups comprises one or more switches respectively controlled by one or more control signals transmitted through the one or more control wires.

2. The sensor system of claim 1, wherein the controller comprises one or more pins connected to the at least one multiplexer via the one or more control wires and the one or more sensing wires.

3. The sensor system of claim 2, wherein each of the one or more pins is connected to one of the one or more control wires or one of the one or more sensing wires.

4. The sensor system of claim 1, wherein the controller is configured to transmit driving signals to control the one or more sensing areas to perform sensing, and receive sensing signals from the sensing area through each of the one or more sensing wires.

5. The sensor system of claim 1, wherein the controller is configured to control the at least one multiplexer to perform sensing on the one or more sensing areas in a specific order by triggering the one or more control wires in an order.

6. The sensor system of claim 1, wherein the controller is configured to transmit one of the one or more control signal signals from a same control wire among the one or more control wires to plural ones of the one or more switches connected to specific sensing areas among the one or more sensing areas.

7. The sensor system of claim 6, wherein the specific sensing areas is configured to undergo sensing simultaneously.

8. The sensor system of claim 1, wherein the at least one multiplexer is fabricated on a substrate of the sensing panel.

9. The sensor system of claim 1, wherein the controller is configured to control the at least one multiplexer to perform sensing on the one or more sensing areas row by row or column by column according to the one or more control signals on the one or more control wires.

10. The sensor system of claim 9, wherein the controller is configured to provide one of the one or more control signals through a same control wire among the one or more control wires to one or more switches of the at least one multiplexer connected to a same row or a same column of sensing areas among the one or more sensing areas.

11. The sensor system of claim 10, wherein the one or more sensing areas are configured to undergo sensing row by row or column by column.

12. The sensor system of claim 1, wherein the controller is configured to control the at least one multiplexer to perform sensing on at least two columns of the one or more sensing areas simultaneously or at least two rows of the one or more sensing areas simultaneously.

13. The sensor system of claim 12, wherein the controller is configured to trigger the one or more control signals on different control wires among the one or more control wires simultaneously.

14. The sensor system of claim 1, wherein the controller is configured to transmit one of the one or more control signal simultaneously to at least two multiplexers among the at least one multiplexer.

15. The sensor system of claim 14, wherein the controller is configured to perform sensing on at least two columns of the one or more sensing areas simultaneously or at least two rows of the one or more sensing areas simultaneously.

16. The sensor system of claim 1, wherein the sensor system is a touch sensor system.

17. The sensor system of claim 1, wherein the sensor system is a fingerprint sensor system.

18. A multiplexer used in a sensor system, wherein the multiplexer is coupleable to a controller via one or more control wires and one or more sensing wires, and the multiplexer is coupleable to a sensing panel through one or more connecting wire groups, each of the one or more connecting wire groups comprising one or more connecting wires, the multiplexer comprising:
  one or more switch groups each coupled between one of the sensing wires and one of the one or more connecting wire groups, each of the switch groups comprising:
    one or more switches, each of which comprising:
      a first connection terminal, coupled to the controller via one of the one or more sensing wires;
      a second connection terminal, coupled to the sensing panel, the sensing panel comprising one or more sensing areas; and
      a control terminal, coupled to one of the one or more control wires, for receiving one of one or more control signals from the controller;
  wherein the one or more switches in each of the switch groups are respectively controlled by one or more control signals transmitted through the control wires.

19. The multiplexer of claim 18, wherein the sensor system is a touch sensor system.

20. The multiplexer of claim 18, wherein the sensor system is a fingerprint sensor system.

21. A multiplexer used in a sensor system, wherein the multiplexer is coupleable to a controller via one or more control wires and one or more sensing wires, and the multiplexer is coupleable to a sensing panel through one or more connecting wire groups, each of the one or more connecting wire groups comprising one or more connecting wires, the multiplexer comprising:
  one or more switch groups each coupled between one of the sensing wires and one of the one or more connecting wire groups, each of the switch groups comprising:
    one or more switches, each of which comprising:
      a first connection terminal, coupled to the controller via one of the one or more sensing wires;
      a second connection terminal, coupled to the sensing panel, the sensing panel comprising one or more sensing areas; and
      a control terminal, coupled to one of the one or more control wires, for receiving one of one or more control signals from the controller.

22. The multiplexer of claim 21, wherein the one or more switches in each of the switch groups are respectively controlled by the one or more control signals transmitted through the control wires.

23. The multiplexer of claim 21, wherein the sensor system is a touch sensor system.

24. The multiplexer of claim 21, wherein the sensor system is a fingerprint sensor system.

25. A sensor device, comprising:
  at least one multiplexer, configured to be coupled to one or more sensing areas of a sensing panel through one or more connecting wire groups on the sensing panel, wherein each of the one or more connecting wire groups comprises one or more connecting wires; and
  a controller, configured to be coupled to the at least one multiplexer via one or more control wires and one or more sensing wires;
  wherein each of the at least one multiplexer comprises one or more switch groups each coupled between one of the one or more sensing wires and one of the one or more connecting wire groups, and each of the switch groups comprises one or more switches respectively controlled by one or more control signals transmitted through the one or more control wires.

26. The sensor device of claim 25, wherein the controller comprises one or more pins connected to the at least one multiplexer via the one or more control wires and the one or more sensing wires.

27. The sensor device of claim 26, wherein each of the one or more pins is connected to one of the one or more control wires or one of the one or more sensing wires.

28. The sensor device of claim 25, wherein the sensor device is a touch sensor device.

29. The sensor device of claim 25, wherein the sensor device is a fingerprint sensor device.

30. A sensing panel apparatus, configured to be controlled by a controller, comprising:
  a sensing panel, comprising one or more sensing areas; and
  at least one multiplexer, coupled to the one or more sensing areas through one or more connecting wire groups on the sensing panel, wherein each of the one or more connecting wire groups comprises one or more connecting wires;
  wherein each of the at least one multiplexer comprises one or more switch groups each coupled between one of the one or more sensing wires and one of the one or more connecting wire groups, and each of the switch groups comprises one or more switches respectively controlled by one or more control signals transmitted through the one or more control wires.

31. The sensing panel apparatus of claim 30, wherein the sensing panel is a touch panel.

32. The sensing panel apparatus of claim 30, wherein the sensing panel is a fingerprint sensing panel.

33. A controller, configured to control a sensing panel apparatus, the sensing panel apparatus comprising a sensing panel comprising one or more sensing areas, and at least one multiplexer coupled to the one or more sensing areas through one or more connecting wire groups on the sensing panel, wherein each of the one or more connecting wire groups comprises one or more connecting wires, and each of the at least one multiplexer comprises one or more switch groups each coupled between one of the one or more sensing wires and one of the one or more connecting wire groups, wherein the controller comprises:
  one or more pins connected to the at least one multiplexer via one or more control wires and one or more sensing wires; and
  control logic providing one or more control signals configured to be transmitted through the one of more control wires to respectively control one or more switches in each of the switch groups.

34. The controller of claim 33, wherein the controller is configured to transmit driving signals to control the one or more sensing areas to perform sensing, and receive sensing signals from the sensing area through each of the one or more sensing wires.

35. The controller of claim 33, wherein the controller is configured to control the at least one multiplexer to perform sensing on the one or more sensing areas in a specific order by triggering the one or more control wires in an order.

36. The controller of claim 33, wherein the controller is configured to transmit one of the one or more control signal signals from a same control wire among the one or more control wires to plural ones of the one or more switches connected to specific sensing areas among the one or more sensing areas.

37. The controller of claim 36, wherein the controller is configured to control the sensing panel apparatus such that the specific sensing areas undergo sensing simultaneously.

38. The controller of claim 37, wherein the at least one multiplexer is fabricated on a substrate of the sensing panel.

39. The controller of claim 33, wherein the controller is configured to control the at least one multiplexer to perform sensing on the one or more sensing areas row by row or column by column according to the one or more control signals on the one or more control wires.

40. The controller of claim 39, wherein the controller is configured to provide one of the one or more control signals through a same control wire among the one or more control wires to one or more switches of the at least one multiplexer connected to a same row or a same column of sensing areas among the one or more sensing areas.

41. The controller of claim 40, wherein the controller is configured to control the sensing panel apparatus such that the one or more sensing areas undergo sensing row by row or column by column.

42. The controller of claim 33, wherein the controller is configured to control the at least one multiplexer to perform sensing on at least two columns of the one or more sensing areas simultaneously or at least two rows of the one or more sensing areas simultaneously.

43. The controller of claim 42, wherein the controller is configured to trigger the one or more control signals on different control wires among the one or more control wires simultaneously.

44. The controller of claim 33, wherein the controller is configured to transmit one of the one or more control signal simultaneously to at least two multiplexers among the at least one multiplexer.

45. The controller of claim 44, wherein the controller is configured to perform sensing on at least two columns of the one or more sensing areas simultaneously or at least two rows of the one or more sensing areas simultaneously.

46. The controller of claim 33, wherein the controller is a touch controller.

47. The controller of claim 33, wherein the controller is a fingerprint sensing circuit.

\* \* \* \* \*